United States Patent
Liu et al.

(10) Patent No.: US 7,804,422 B2
(45) Date of Patent: Sep. 28, 2010

(54) LIGHTING DEVICE WITH INDICATOR

(75) Inventors: Chia-Yu Liu, Taipei (TW); Tzu-Nan Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 379 days.

(21) Appl. No.: 12/104,993

(22) Filed: Apr. 17, 2008

(65) Prior Publication Data

US 2009/0109353 A1    Apr. 30, 2009

(51) Int. Cl.
*G08B 5/00*    (2006.01)
(52) U.S. Cl. .............. 340/815.6; 315/129; 315/158
(58) Field of Classification Search . 340/815.4–815.79; 315/158, 291, 129; 362/802
See application file for complete search history.

(56) References Cited

U.S. PATENT DOCUMENTS

| | | | | |
|---|---|---|---|---|
| 5,489,891 A | * | 2/1996 | Diong et al. ................ 340/567 |
| 5,854,422 A | * | 12/1998 | McKeon et al. .............. 73/49.2 |
| 6,107,938 A | * | 8/2000 | Du et al. ................. 340/825.72 |
| 6,498,600 B1 | * | 12/2002 | Vance et al. ................. 345/168 |
| 2005/0151489 A1 | * | 7/2005 | Lys et al. .................... 315/308 |

* cited by examiner

*Primary Examiner*—Brent Swarthout
(74) *Attorney, Agent, or Firm*—Thomas, Kayden, Horstemeyer & Risley, LLP (57) ABSTRACT

A lighting device includes a light-emitting element, an ultrasonic member, a signal processing unit, a light control unit, an indicator and an indicator control unit. The light-emitting element emits a light. The ultrasonic member emits an ultrasonic signal and receives the ultrasonic signal reflected from an object. The signal processing unit is communicated with the ultrasonic member for converting the reflected ultrasonic signal into a control signal. The light control unit is interconnected between the signal processing unit and the light-emitting element for controlling the light-emitting element to emit light in a selected operating mode in response to the control signal. The indicator control unit is interconnected between the signal processing unit and the indicator for controlling the indicator to assert a notification signal indicative of the operating mode in response to the control signal.

12 Claims, 8 Drawing Sheets

LIGHTING DEVICE WITH INDICATOR

FIELD OF THE INVENTION

The present invention relates to a lighting device, and more particularly to a lighting device with an indicator.

BACKGROUND OF THE INVENTION

The use of remote controllers facilitates manipulation of household electrical appliances such as TV sets, video tape recorders, audio equipments, air conditioners, and so on. Recently, a lamp remote controller is used to handle on/off statuses, lighting styles, brightness, and light colors of the lamps. The user can handle the lamp within a distance of several meters from the lamp through the remote controller. Although the use of remote controller to control the lamp is convenient, there are still some drawbacks. For example, the remote controller should be stored in an easily accessible place; otherwise, it becomes quite inconvenient to search the remote controller. In addition, since various kinds of electrical appliances have their own remote controllers, the user is often confused with a lot of remote controllers and the selection of the actual remote controller becomes troublesome. Moreover, too many remote controllers are neither cost-effective nor user-friendly.

For reducing the dependence on remote controllers, a method for controlling a lamp according to the detected movement of a user's hand has been developed in WO 2006/056814, which is entitled "PROXIMITY SENSOR DIMMING CONTROL FOR A LIGHT", and the contents of which are hereby incorporated by reference. The lamp disclosed in WO 2006/056814 includes an infrared emitter for providing an infrared beam and an infrared detector for detecting the reflected infrared beam which is reflected by an object (e.g. the user's hand) positioned in the path of the infrared beam. In a case that the user's hand enters the path of the infrared beam, the lamp is turned on. On the contrary, the lamp is turned off if the user's hand exits the path of the infrared beam. Generally, the intensity of infrared light reflected from the object and received by the infrared detector is dependent on the inverse square of the distance between the infrared detector and the object. By determining the movement of the user's hand away from or toward the infrared detector, the brightness of the light is decreased or increased. Since the intensity of infrared light detected by the infrared detector is interfered with the background brightness, the detecting accuracy is deteriorated. In addition, the operating range of the infrared detector is highly dependent on the intensity of the received infrared light.

Therefore, there is a need of providing a lighting device capable of controlling the light and minimally interfered with the ambient parameters.

SUMMARY OF THE INVENTION

The present invention provides a lighting device with an indicator for facilitating the users to realize whether they enter the covering range of the ultrasonic signal and what the operating mode of the lighting device is.

The present invention provides a lighting device capable of controlling the light and minimally interfered with the ambient parameters, thereby enhancing the detecting accuracy.

In accordance with a first aspect of the present invention, there is provided a lighting device. The lighting device includes a light-emitting element, an ultrasonic member, a signal processing unit, a light control unit, an indicator, and an indicator control unit. The light-emitting element emits a light. The ultrasonic member emits an ultrasonic signal and receives the ultrasonic signal reflected from an object. The signal processing unit is communicated with the ultrasonic member for converting the reflected ultrasonic signal into a control signal. The light control unit is interconnected between the signal processing unit and the light-emitting element for controlling the light-emitting element to emit light in a selected operating mode in response to the control signal. The indicator control unit is interconnected between the signal processing unit and the indicator for controlling the indicator to assert a notification signal indicative of the operating mode in response to the control signal.

In accordance with a second aspect of the present invention, there is provided a method of controlling a lighting device. The lighting device includes a light-emitting element, an ultrasonic member, a signal processing unit, a light control unit, an indicator, and an indicator control unit. The method comprising steps of: emitting an ultrasonic signal by the ultrasonic element when the ultrasonic member is in a wait status; receiving the ultrasonic signal reflected from an object by the ultrasonic member if the object is positioned within the covering range of the ultrasonic signal; converting the reflected ultrasonic signal into a control signal by the signal processing unit; controlling the light-emitting element to emit light in a selected operating mode in response to the control signal by the light control unit; and controlling the indicator to assert a notification signal indicative of the operating mode in response to the control signal by the indicator control unit.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
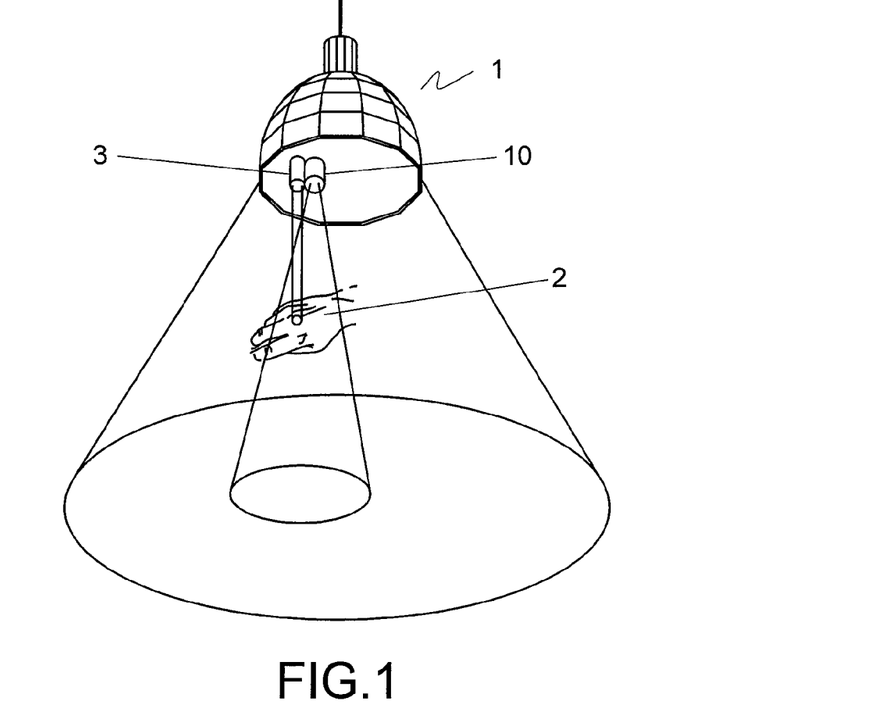
FIG. 1 schematically illustrates a lighting device with an indicator according to the present invention.

FIG. 1 schematically illustrates a lighting device with an indicator according to the present invention. The lighting device 1 of FIG. 1 includes one or more light-emitting elements (not shown) and an ultrasonic member 10. Examples of the light-emitting elements include but are not limited to incandescent bulbs or light emitting diodes (LEDs). The ultrasonic member 10 includes an ultrasonic emitter and an ultrasonic receiver. Alternatively, the ultrasonic member 10 can be an ultrasonic transceiver having both function of an ultrasonic emitter and an ultrasonic receiver.

When the ultrasonic member 10 is in a wait status, an ultrasonic signal is emitted from the ultrasonic emitter of the ultrasonic member 10. In a case that an object 2 (e.g. a user's hand) is positioned within the covering range of the ultrasonic signal, the ultrasonic signal is reflected by the object 2 and received by the ultrasonic receiver of the ultrasonic member 10. In the context, the time of the ultrasonic signal emitted from the ultrasonic emitter, reflected through the object to reach the ultrasonic receiver is referred as the time of flight. If the distance between the object 2 and the lighting device 1 is varied, the time of flight for the ultrasonic signal is changed correspondingly. According to a change of the time of flight, a digital control signal is generated. In response to the digital control signal, the lighting device 1 can produce light with adjustable optical characteristics including the color, the brightness or the color temperature of the light.

Please refer to FIG. 1 again. In a case that the user's hand 2 is positioned within the covering range of the ultrasonic signal, the optical characteristics of the lighting device 1 can be adjusted by determining a change of the time of flight in response to the movement of the user's hand 2 away from or toward the infrared detector.

Since the ultrasonic signal cannot be detected by human hearing and human eyes, the user fails to discriminate whether the presence or covering range of the ultrasonic signal. For addressing these problems, the lighting device 1 further includes an indicator 3 for generating a notification signal which is easily sensed by the user. For example, the indicator 3 may assert an optical signal or an audio signal to notify the user that the user's hand 2 enters the covering range of the ultrasonic signal. Alternatively, the indicator 3 may assert different light patterns, light colors or speech prompts to notify the user of the operating modes of the lighting device 1. In different operating modes, the lighting device 1 produces light with different colors, brightness or color temperatures.

Figure 2:
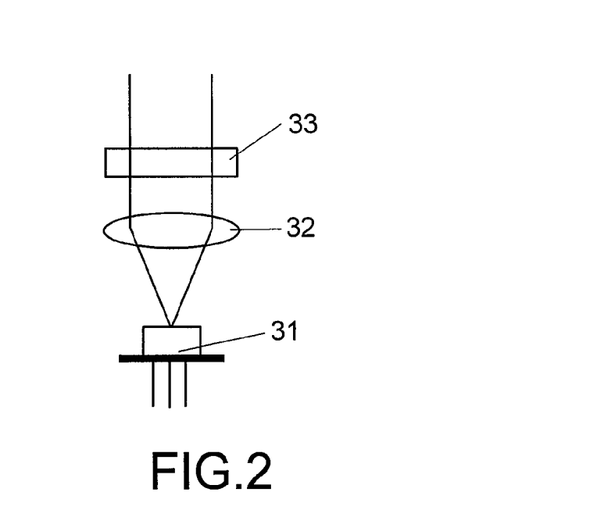
FIG. 2 is a schematic view illustrating an indicator according to a first preferred embodiment of the present invention.

Referring to FIG. 2, a schematic view of an indicator according to a first preferred embodiment of the present invention is illustrated. In this embodiment, the indicator includes a laser diode (LD) 31. Due to the directive property of the laser beams emitted from the laser diode 31, the laser diode 31 is suitable as the indicator. Even if the laser beams have the excellent directive property, the laser beams are slightly scattered at a small divergence angle. For concentrating the laser beams, a collimator lens 32 is introduced downstream of the laser diode 31 to collimate the laser beams from the laser diode 31 into parallel beams. Moreover, the laser beams may hurt the user's eyes due to the relatively strong intensity. As a consequence, an attenuator 33 is arranged downstream of the collimator lens 32 for reducing the energy of the collimated laser beam, so that the intensity of the collimated laser beam is decreased to a level without hurting the user's eyes but sufficient to provide the indicating function.

Figure 3A:
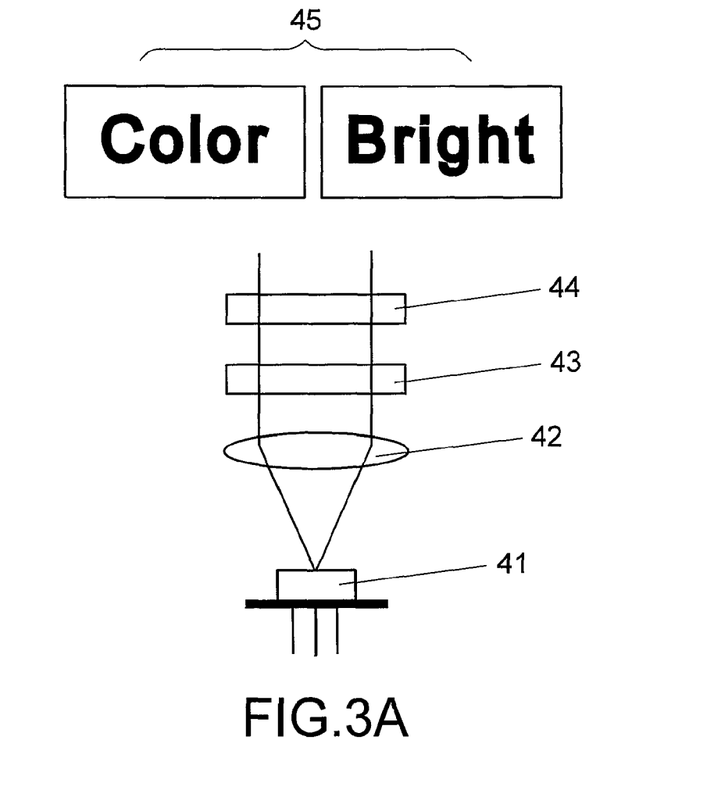
FIG. 3A is a schematic view illustrating an indicator according to a second preferred embodiment of the present invention.

Referring to FIG. 3A, a schematic view of an indicator according to a second preferred embodiment of the present invention is illustrated. In this embodiment, the indicator includes a laser diode 41, a collimator lens 42 and a diffraction element 43. The collimator lens 42 is arranged downstream of the laser diode 41 to collimate the laser beams from the laser diode 41 into parallel beams. The diffraction element 43 is arranged downstream of the collimator lens 42. Due to the coherent property of the laser beams emitted from the laser diode 41, a diffraction pattern 45 will be created after the collimated laser beams pass through the diffraction element 43. Different diffraction patterns 45 indicate the operating modes of the lighting device 1. For example, the diffraction patterns "Bright" and "Color" indicate that the lighting device 1 is operated in a brightness control mode and a light color control mode, respectively.

Figure 3B:
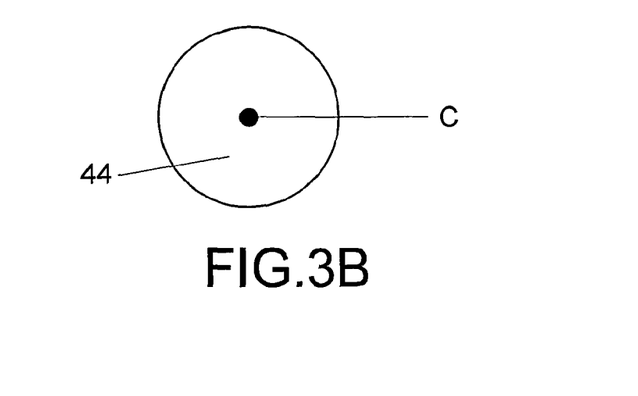
FIG. 3B is a schematic view of a shielding element used in the indicator of FIG. 3A.

Although the intensity of the laser beams is slightly decreased after the collimated laser beams pass through the diffraction element 43, the energy of the zero-order laser beams is still strong and harmful to the user's eyes. For eliminating the zero-order laser beams, a shielding element 44 is optionally arranged downstream of the diffraction element 43. As shown in FIG. 3B, the shielding element 44 includes an opaque or light-absorbing portion in the center C and a transparent portion surrounding the center C. The energy of the zero-order laser beams is shielded by the opaque or light-absorbing portion of the shielding element 44 but the diffraction pattern 45 is penetrable through the transparent portion of the shielding element 44. Since the zero-order laser beams are eliminated, the diffraction pattern 45 is harmless to the user's eyes.

Figure 4A:
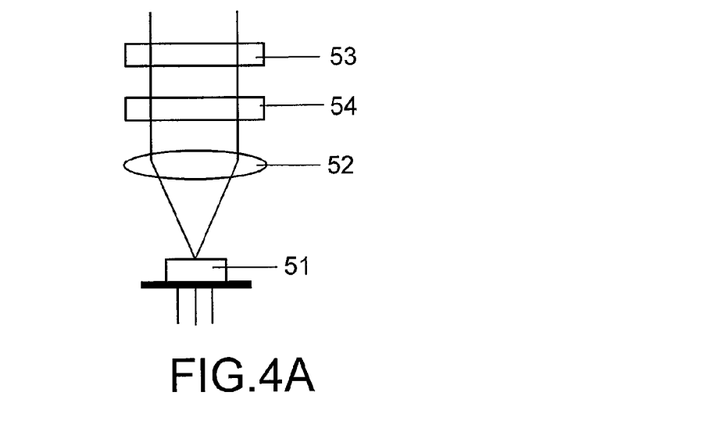
FIG. 4A is a schematic view illustrating an indicator according to a third preferred embodiment of the present invention.

Referring to FIG. 4A, a schematic view of an indicator according to a third preferred embodiment of the present invention is illustrated. In this embodiment, the indicator includes a laser diode 51, a collimator lens 52, a diffraction element 53 and a liquid crystal element 54. The collimator lens 52 is arranged downstream of the laser diode 51 to collimate the laser beams from the laser diode 51 into parallel beams. The diffraction element 53 is arranged downstream of the collimator lens 52. Due to the coherent property of the laser beams emitted from the laser diode 51, a diffraction pattern will be created after the collimated laser beams pass through the diffraction element 53. In addition, the liquid crystal element 54 is inserted between the collimator lens 52 and the diffraction element 53. Because the diffraction pattern is dependent on the polarization direction of the laser beams, by applying different bias voltages to the liquid crystal element 54, the polarization direction of the laser beams is changeable, so that the diffraction pattern is changeable.

Figure 4B:
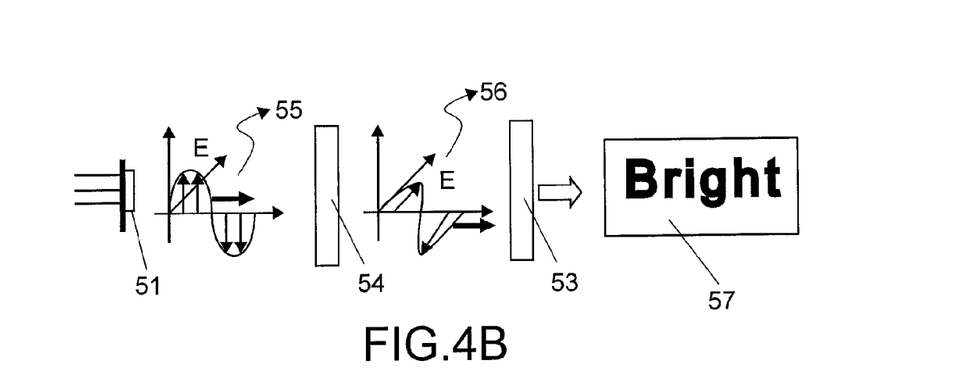
FIG. 4B is a schematic view illustrating the influence of the liquid crystal element of FIG. 4A, in which no bias voltage is applied to the liquid crystal element.
Figure 5A:
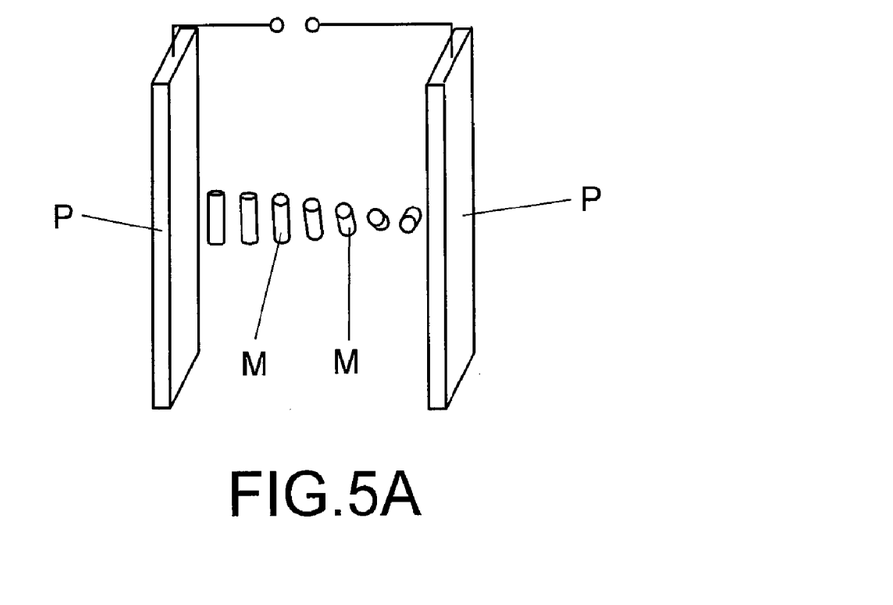
FIG. 5A schematically illustrates the arrangement of the liquid crystal molecules when no bias voltage is applied to the liquid crystal element.

In FIG. 5A, the arrangement of the liquid crystal molecules M when no bias voltage is applied thereto is schematically shown. In this case that no bias voltage is applied to the liquid crystal element 54, as shown in FIG. 4B and FIG. 5A, the polarization direction of the laser beams is changed with the long axis of the liquid crystal molecules M when the laser beams pass across the liquid crystal element 54 between the electrodes P. As shown in FIG. 4B, after the collimated laser beams 55 pass through the liquid crystal element 54, polarized laser beams 56 are created. The polarization direction of the polarized laser beams 56 is perpendicular to that of collimated laser beams 55. After the polarized laser beams 56 pass through the diffraction element 53, a "Bright" diffraction pattern 57 indicative of a brightness control mode is created.

Figure 4C:
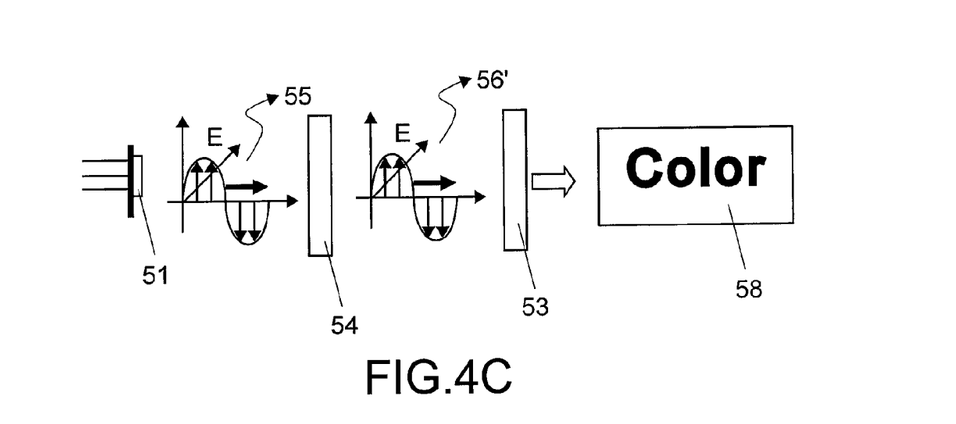
FIG. 4C is a schematic view illustrating the influence of the liquid crystal element of FIG. 4A, in which a bias voltage is applied to the liquid crystal element.
Figure 5B:
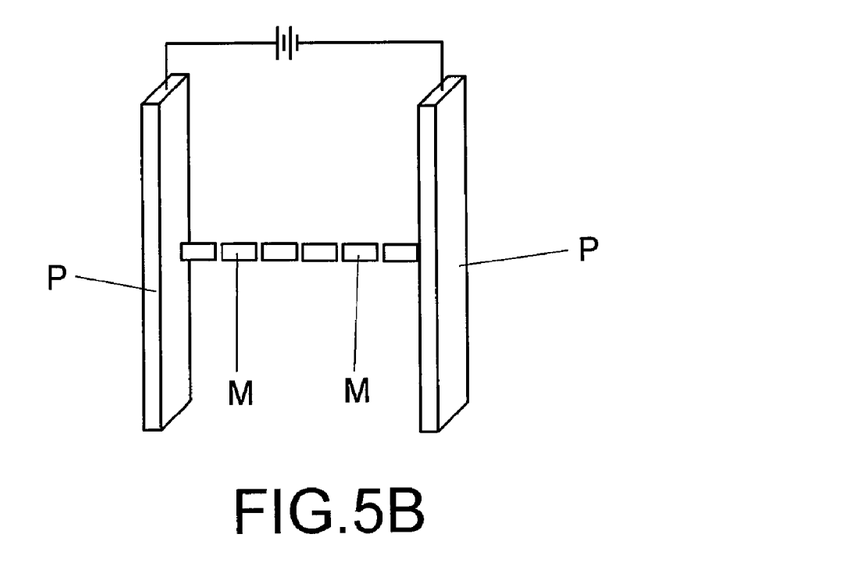
FIG. 5B schematically illustrates the arrangement of the liquid crystal molecules when a bias voltage is applied to the liquid crystal element.

In FIG. 5B, the arrangement of the liquid crystal molecules M when a bias voltage is applied thereto is schematically shown. In this case that a bias voltage is applied to the liquid crystal element 54, as shown in FIG. 4C and FIG. 5B, the polarization direction of the laser beams is unchanged when the laser beams pass across the liquid crystal element 54 between the electrodes P. As shown in FIG. 4C, after the collimated laser beams 55 pass through the liquid crystal element 54, the polarization direction of the laser beams 56' is not changed (i.e. the polarization direction of the laser beams 56' is coincide with that of collimated laser beams 55). After the laser beams 56' pass through the diffraction element 53, a "Color" diffraction pattern 58 indicative of a light color control mode is created.

In a case that a desired operating mode of the lighting device is selected, a signal processing unit will assert a corresponding digital signal to an indicator control unit. In response to the digital signal, the indicator control unit controls the bias voltage applied to the liquid crystal element 54. By adjusting the bias voltages, the polarization direction of the laser beams passed the liquid crystal element 54 is changeable. After the laser beams pass through the diffraction element 53, diffraction patterns with different visual instructions are created.

Figure 6A:
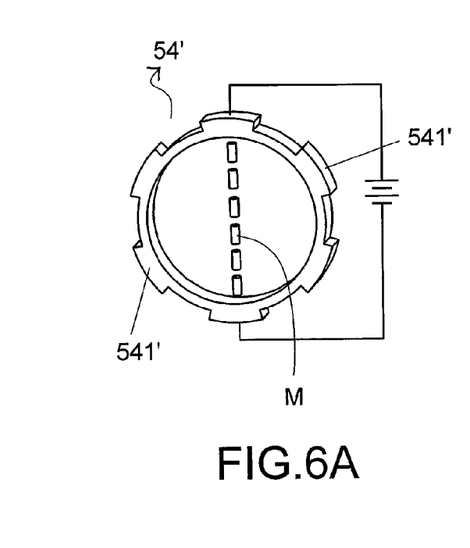
FIG. 6A schematically illustrates a first type arrangement of the liquid crystal molecules when a bias voltage is applied to the liquid crystal element.
Figure 6B:
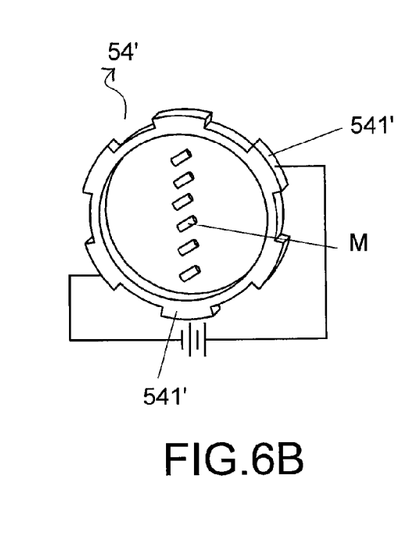
FIG. 6B schematically illustrates a second type arrangement of the liquid crystal molecules when a bias voltage is applied to the liquid crystal element.
Figure 6C:
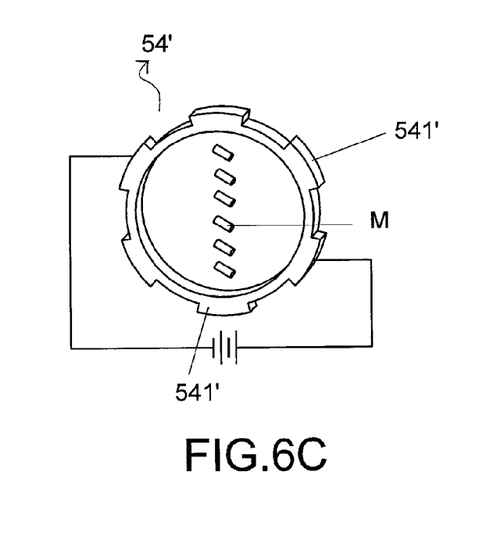
FIG. 6C schematically illustrates a third type arrangement of the liquid crystal molecules when a bias voltage is applied to the liquid crystal element.

It is noted that, however, those skilled in the art will readily observe that numerous modifications and alterations may be made while retaining the teachings of the invention. For example, as shown in FIGS. 6A, 6B and 6C, a multi-indicative liquid crystal element 54' is employed in replace of the liquid crystal element 54 shown in FIGS. 4B and 4C. The multi-indicative liquid crystal element 54' includes a plurality of electrodes 541'. When a bias voltage is applied to different pairs of electrodes, the liquid crystal molecules M is twisted at different angles, so that the polarization direction of the laser beams passed the liquid crystal element 54' is changeable. As shown in FIGS. 6A, 6B and 6C, the arrangements of the liquid crystal molecules M when a bias voltage is applied to different pairs of electrodes are respectively shown. After the laser beams pass through the diffraction element 53, diffraction patterns with different visual instructions are created.

Figure 7A:
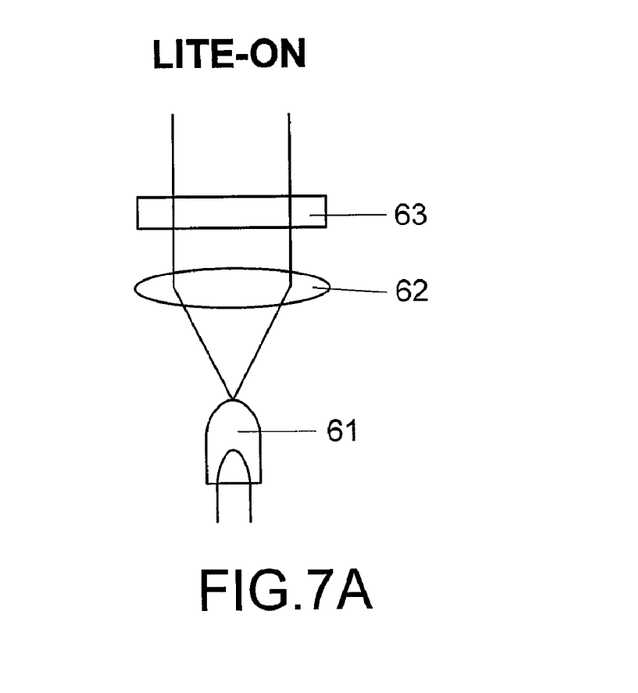
FIG. 7A is a schematic view illustrating an indicator according to a fourth preferred embodiment of the present invention.
Figure 7B:
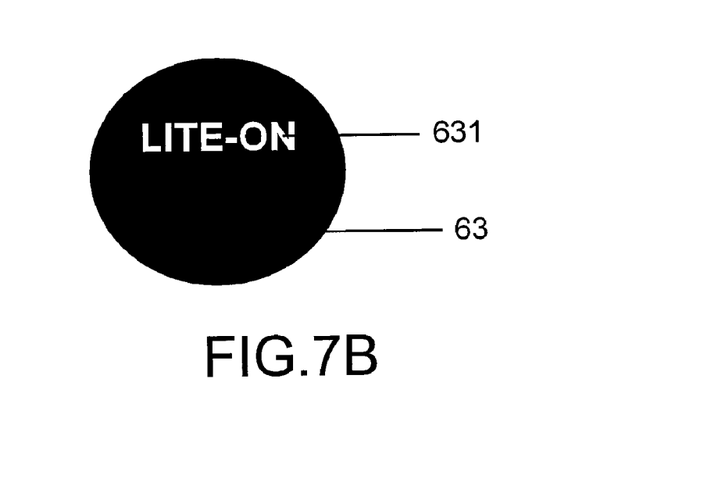
FIG. 7B is a schematic plan view of the pattern generator shown in FIG. 7A.

Referring to FIG. 7A, a schematic view of an indicator according to a fourth preferred embodiment of the present invention is illustrated. In this embodiment, the indicator includes a light-emitting diode (LED) 61, a collimator lens 62 and a pattern generator 63. The collimator lens 62 is arranged downstream of the LED 61 to collimate the laser beams from the LED 61 into parallel beams. The pattern generator 63 is arranged downstream of the collimator lens 62. As shown in FIG. 7B, the pattern generator 63 has a transparent portion 631 corresponding to the predetermined optical pattern and a remaindering opaque portion. After the collimated laser beams pass through the pattern generator 63, the optical pattern indicative of a current operating mode is created.

In an alternative, the positions of the collimator lens 62 and the pattern generator 63 shown in FIG. 7A can be exchanged but the result and the performance are identical.

In the above embodiments, the present invention is illustrated by referring to a lighting device with a visual indicator and the configuration of such a lighting device will be illustrated with reference to FIG. 8.

The lighting device 1 of the present invention includes a light-emitting element 9, an ultrasonic member 10, a visual indicator 11, a signal processing unit 12, a light control unit 13 and a visual indicator control unit 14. When the ultrasonic member 10 is in a wait status, an ultrasonic signal is emitted from the ultrasonic member 10. In a case that an object 2 is positioned within the covering range of the ultrasonic signal, the ultrasonic signal is reflected by the object 2 and received by the ultrasonic member 10. The time of flight is calculated and then transmitted to the signal processing unit 12. According to a change of the time of flight, the signal processing unit 12 asserts a digital control signal to the light control unit 13 and the visual indicator control unit 14. In response to the digital control signal received by the light control unit 13, the light control unit 13 asserts a lighting control signal to control the light-emitting element 9 to emit light in a selected operating mode, e.g. a light color control mode, a color temperature control mode or a brightness control mode. At the same time, in response to the digital control signal received by the visual indicator control unit 14, the visual indicator control unit 14 asserts a control signal to control the visual indicator 11 to emit a visual notification signal (e.g. a light spot or a pattern) to notify the user of the operating modes of the lighting device 1.

It is noted that, however, those skilled in the art will readily observe that numerous modifications and alterations may be made while retaining the teachings of the invention. For example, the lighting device may include a hearing indicator in replace of the visual indicator. A configuration of a lighting device with a hearing indicator will be illustrated with reference to FIG. 9.

Figure 8:
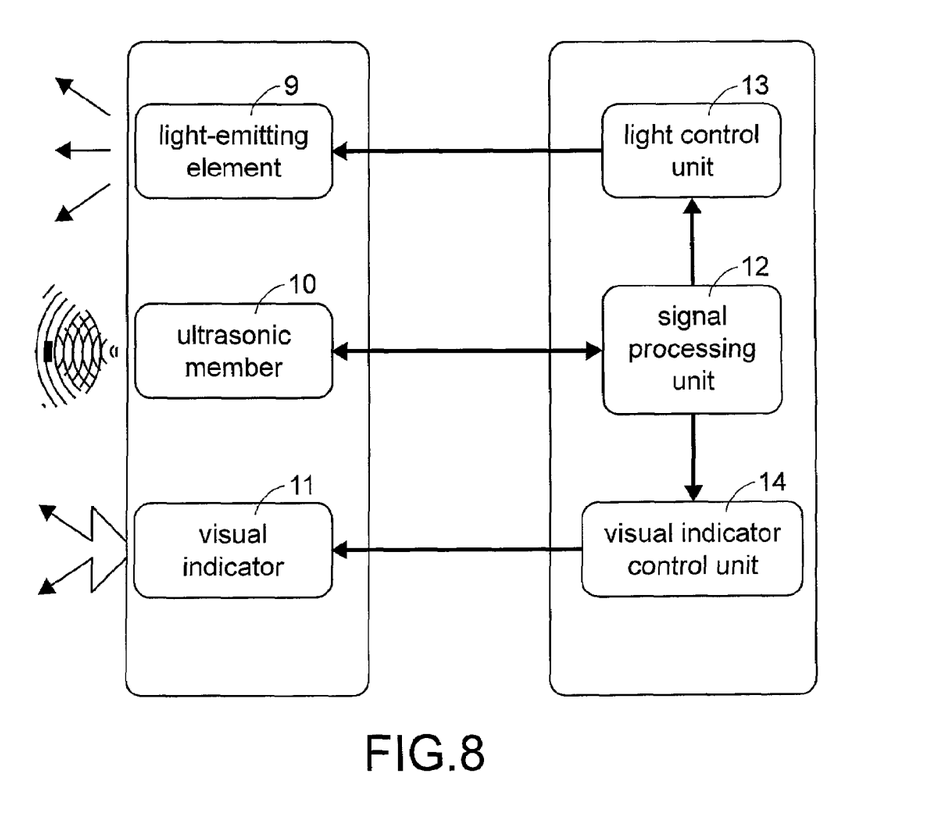
FIG. 8 schematically illustrates a configuration of a lighting device with a visual indicator according to the present invention.
Figure 9:
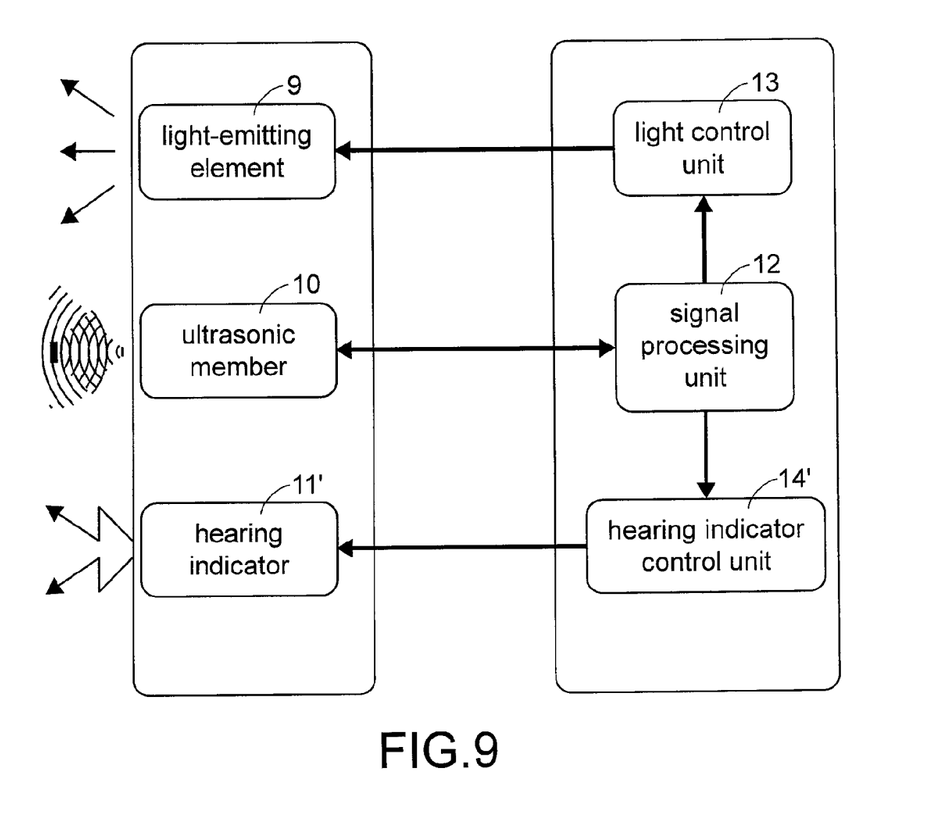
FIG. 9 schematically illustrates a configuration of a lighting device with a hearing indicator according to the present invention.

The light-emitting element 9, the ultrasonic member 10, the signal processing unit 12 and the light control unit 13 included in the lighting device of FIG. 9 are similar to those shown in FIG. 8, and are not redundantly described herein. In this embodiment, the lighting device further includes a hearing indicator 11' and a hearing indicator control unit 14' to replace the visual indicator 11 and the visual indicator control unit 14. An example of the hearing indicator 11' is a loudspeaker. When the digital control signal asserted from the signal processing unit 12 is received by the hearing indicator control unit 14', the hearing indicator control unit 14' asserts a control signal to control the hearing indicator 11' to emit a hearing notification signal (e.g. a buzzer sound or a speech prompt) to notify the user of the operating modes of the lighting device 1.

From the above description, the visual indicator or the hearing indicator of the lighting device of the present invention can facilitate the users to realize whether they enter the covering range of the ultrasonic signal and what the operating mode of the lighting device is. In addition, since the ultrasonic signal is minimally interfered with the background brightness or background noise, the detecting accuracy is enhanced.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lighting device comprising:
  a light-emitting element for emitting a light;
  an ultrasonic member for emitting an ultrasonic signal and receiving the ultrasonic signal reflected from an object;
  a signal processing unit communicated with the ultrasonic member for converting the reflected ultrasonic signal into a control signal;
  a light control unit interconnected between the signal processing unit and the light-emitting element for controlling the light-emitting element to emit the light in a selected operating mode in response to the control signal;
  a visual indicator; and
  an indicator control unit interconnected between the signal processing unit and the visual indicator for controlling the visual indicator to assert a notification signal indicative of the operating mode in response to the control signal; wherein the visual indicator includes:
  a collimator lens arranged downstream of a laser diode to collimate a laser beam emitted from the laser diode into a collimated laser beam; and
  an attenuator arranged downstream of the collimator lens for reducing the enerqy of the collimated laser beam.

2. The lighting device according to claim 1 wherein the light-emitting element is an incandescent bulb or a light emitting diode.

3. The lighting device according to claim 1 wherein the ultrasonic member further includes:
  an ultrasonic emitter for emitting the ultrasonic signal; and
  an ultrasonic receiver for receiving the reflected ultrasonic signal.

4. A lighting device comprising:
  a light-emitting element for emitting a light;
  an ultrasonic member for emitting an ultrasonic signal and receiving the ultrasonic signal reflected from an object;
  a signal processing unit communicated with the ultrasonic member for converting the reflected ultrasonic signal into a control signal;
  a light control unit interconnected between the signal processing unit and the light-emitting element for controlling the light-emitting element to emit the light in a selected operating mode in response to the control signal;
  a visual indicator; and
  an indicator control unit interconnected between the signal processing unit and the visual indicator for controlling the visual indicator to assert a notification signal indicative of the operating mode in response to the control signal;
  a collimator lens arranged downstream of a laser diode to collimate a laser beam emitted from the laser diode into a collimated laser beam;
  a diffraction element arranged downstream of the collimator lens for diffracting the collimated laser beam into a diffraction pattern; and
  optionally a shielding element arranged downstream of the diffraction element for eliminating the zero-order laser beam.

5. A lighting device comprising:
  a light-emitting element for emitting a light;
  an ultrasonic member for emitting an ultrasonic signal and receiving the ultrasonic signal reflected from an object;
  a signal processing unit communicated with the ultrasonic member for converting the reflected ultrasonic signal into a control signal;
  a light control unit interconnected between the signal processing unit and the light-emitting element for controlling the light-emitting element to emit the light in a selected operating mode in response to the control signal;
  a visual indicator; and
  an indicator control unit interconnected between the signal processing unit and the visual indicator for controlling the visual indicator to assert a notification signal indicative of the operating mode in response to the control signal;
  a collimator lens arranged downstream of a laser diode to collimate a laser beam emitted from the laser diode into a collimated laser beam;
  a liquid crystal element arranged downstream of the collimator lens for changing the polarization direction of the collimated laser beam according to a bias voltage applied to the liquid crystal element; and
  a diffraction element arranged downstream of the liquid crystal element for diffracting the laser beam into a diffraction pattern.

6. A lighting device comprising:
  a light-emitting element for emitting a light;
  an ultrasonic member for emitting an ultrasonic signal and receiving the ultrasonic signal reflected from an object;
  a signal processing unit communicated with the ultrasonic member for converting the reflected ultrasonic signal into a control signal;
  a light control unit interconnected between the signal processing unit and the light-emitting element for controlling the light-emitting element to emit the light in a selected operating mode in response to the control signal;
  a visual indicator; and
  an indicator control unit interconnected between the signal processing unit and the visual indicator for controlling the visual indicator to assert a notification signal indicative of the operating mode in response to the control signal;
  a collimator lens arranged downstream of a light-emitting diode to collimate a light emitted from the light-emitting diode into a collimated light; and
  a pattern generator arranged downstream or upstream of the collimator lens and comprising a transparent portion, wherein an optical pattern corresponding to the transparent portion of the pattern generator is created after the light emitted from the light-emitting diode passes through the pattern generator.

7. A method of controlling a lighting device, the lighting device comprising a light-emitting element, an ultrasonic member, a signal processing unit, a light control unit, a visual indicator and an indicator control unit, wherein the visual indicator includes: a collimator lens arranged downstream of a laser diode to collimate a laser beam emitted from the laser diode into a collimated laser beam; and an attenuator arranged downstream of the collimator lens for reducing the energy of the collimated laser beam, the method comprising steps of:
  emitting an ultrasonic signal by the ultrasonic member when the ultrasonic member is in a wait status;

receiving the ultrasonic signal reflected from an object by the ultrasonic member if the object is positioned within the covering range of the ultrasonic signal;

converting the reflected ultrasonic signal into a control signal by the signal processing unit;

controlling the light-emitting element to emit a light in a selected operating mode in response to the control signal by the light control unit; and controlling the visual indicator to assert a notification signal indicative of the operating mode in response to the control signal by the indicator control unit.

8. The method according to claim 7 wherein the light-emitting element is an incandescent bulb or a light emitting diode.

9. The method according to claim 7 wherein the ultrasonic member further includes:

an ultrasonic emitter for emitting the ultrasonic signal; and an ultrasonic receiver for receiving the reflected ultrasonic signal.

10. A method of controlling a lighting device, the lighting device comprising a light-emitting element, an ultrasonic member, a signal processing unit, a light control unit, a visual indicator and an indicator control unit, wherein the visual indicator includes: a collimator lens arranged downstream of a laser diode to collimate a laser beam emitted from the laser diode into a collimated laser beam; a diffraction element arranged downstream of the collimator lens for diffracting the collimated laser beam into a diffraction pattern; and optionally a shielding element arranged downstream of the diffraction element for eliminating the zero-order laser beam, the method comprising steps of:

emitting an ultrasonic signal by the ultrasonic member when the ultrasonic member is in a wait status;

receiving the ultrasonic signal reflected from an object by the ultrasonic member if the object is positioned within the covering range of the ultrasonic signal;

converting the reflected ultrasonic signal into a control signal by the signal processing unit;

controlling the light-emitting element to emit a light in a selected operating mode in response to the control signal by the light control unit; and controlling the visual indicator to assert a notification signal indicative of the operating mode in response to the control signal by the indicator control unit.

11. A method of controlling a lighting device, the lighting device comprising a light-emitting element, an ultrasonic member, a signal processing unit, a light control unit, a visual indicator and an indicator control unit, wherein the visual indicator includes: a collimator lens arranged downstream of a laser diode to collimate a laser beam emitted from the laser diode into a collimated laser beam; a liquid crystal element arranged downstream of the collimator lens for changing the polarization direction of the collimated laser beam according to a bias voltage applied to the liquid crystal element; and a diffraction element arranged downstream of the liquid crystal element for diffracting the laser beam into a diffraction pattern, the method comprising steps of:

emitting an ultrasonic signal by the ultrasonic member when the ultrasonic member is in a wait status;

receiving the ultrasonic signal reflected from an object by the ultrasonic member if the object is positioned within the covering range of the ultrasonic signal;

converting the reflected ultrasonic signal into a control signal by the signal processing unit;

controlling the light-emitting element to emit a light in a selected operating mode in response to the control signal by the light control unit; and controlling the visual indicator to assert a notification signal indicative of the operating mode in response to the control signal by the indicator control unit.

12. A method of controlling a lighting device, the lighting device comprising a light-emitting element, an ultrasonic member, a signal processing unit, a light control unit, a visual indicator and an indicator control unit, wherein the visual indicator includes: a collimator lens arranged downstream of a light-emitting diode to collimate a light emitted from the light-emitting diode into a collimated light; and a pattern generator arranged downstream or upstream of the collimator lens and comprising a transparent portion, wherein an optical pattern corresponding to the transparent portion of the pattern generator is created after the light emitted from the light-emitting diode passes through the pattern generator, the method comprising steps of:

emitting an ultrasonic signal by the ultrasonic member when the ultrasonic member is in a wait status;

receiving the ultrasonic signal reflected from an object by the ultrasonic member if the object is positioned within the covering range of the ultrasonic signal;

converting the reflected ultrasonic signal into a control signal by the signal processing unit;

controlling the light-emitting element to emit a light in a selected operating mode in response to the control signal by the light control unit; and controlling the visual indicator to assert a notification signal indicative of the operating mode in response to the control signal by the indicator control unit.

* * * * *